Jan. 10, 1967 A. M. SQUIRES 3,296,775
METHOD AND APPARATUS FOR TREATING FLUIDS AND
NON-FLUID MATERIALS
Original Filed Oct. 16, 1962 4 Sheets-Sheet 2

FIG. 2

INVENTOR.
ARTHUR M. SQUIRES

INVENTOR.
ARTHUR M. SQUIRES

3,296,775
METHOD AND APPARATUS FOR TREATING FLUIDS AND NON-FLUID MATERIALS
Arthur Morton Squires, 245 W. 104th St., New York, N.Y. 10025
Continuation of application Ser. No. 230,822, Oct. 16, 1962. This application Oct. 4, 1965, Ser. No. 492,439
12 Claims. (Cl. 55—98)

This application is continuation of my copending application, Serial No. 230,822, filed October 16, 1962.

The present invention relates to the art of contacting a bed of sand or granular material and a fluid with one another to effect treatment of one or both of them, and is particularly concerned with the periodic removal of the granular material adjacent the fluid entry face of the granular material bed while retaining the remainder of the bed.

The treatment of fluids, and in particular gases, and granular solids by contacting one with the other is of extreme technical importance in a number of industrial fields for various purposes including coal gasifications, catalytic contacting, gas absorption, gas adsorption, and filtering particulate material from gases.

A recognized means for contacting solids and gases was to form one or more panel contactors, with each panel contactor comprising a long narrow vertical bed of granular material retained between opposed perforate walls. The gases were caused to pass through the contactor panel in the narrow direction of the bed. The opposed perforate walls retaining the granular material were made of wire mesh screen, perforated metal sheets, or slat-like members mounted in Venetion blind fashion.

Panel contactors of the aforementioned type provided a considerable amount of gas-solids contact area per unit floor space occupied by the contactor, but in spite of the space advantage, this type of gas-solids contactor had little practical utility because there was no satisfactory way of removing the used up or spent granular material from the bed. The usual manner of removing the spent granular material was by draining the entire bed of solids from the bottom of the panel, and completely replenishing the bed with a corresponding amount of fresh granular material added at the top of the panel. Large amounts of material and considerable storage space were needed for the panel to be kept in substantially continuous use.

Moreover, by discharging the granular material from the bottom of the panel a considerable amount of fresh or unspent granular material was removed from the panel, notably material from the interior and gas-exit portions of the bed. When contacting a bed of granular material with a gas, it is the solids nearest the point at which gas enters the bed which are used up, and which need be replaced after a period of use. It would be desirable to remove the spent or used up solids, that is the granular material in the gas entry portion of the bed, while retaining the fresh or nonspent granular material in the interior and gas exit portions of the bed.

The present invention embodies a fluid-solids contactor comprising a bed of granular material retained between two upwardly extending perforate walls, with the bed having free granular material surfaces adjacent one of the perforate walls. Fluid is passed into contact with the free granular surfaces and through the bed to effect treatment of the fluid or granular material. Periodically a reverse surge flow of gas is passed through the granular material and the one perforate wall in a reverse direction to effect removal of a portion of the granular material adjacent and including the free granular material surfaces.

More particularly, the gaseous fluid-solid contactor of this invention comprises a pair of upwardly extending horizontally spaced-apart perforate retaining walls, a gaseous fluid inlet compartment adjacent and in communication with the perforations of a first of the perforate walls, a gaseous fluid outlet compartment adjacent and in communication with the perforations of the second of the perforate walls, closure means about the space between the first and second perforate walls closing said space against the passage of gas except through the perforations of said perforate walls, feed means for supplying a loose solid particulate material into the space between the perforate walls, a plurality of particulate material support members each adjacent a perforation of said first perforate wall, said particulate-material support members being arranged to extend outwardly and upwardly from below their adjacent perforations and into the inlet compartment to support and expose to the inlet compartment a plurality of free surfaces of particulate material, an inlet for admitting a gaseous fluid into the inlet compartment for passage into the free surfaces and through the particulate material to the outlet compartment, an outlet for discharging gaseous fluid from the outlet compartment, means for periodically effecting a mass movement toward the inlet compartment of at least those portions of the particulate material including said three surfaces and which are retained on said supporting members, said mass-movement means comprises a source of gas under pressures, means for effecting a sudden discharge of gas from the pressure source into the outlet compartment and against the particulate material at a sharply peaking rate of gas flow having a peak value substantially in excess of the minimum steady flow rate at which a flow of gas causes motion of the particulate material, volume control means for limiting the quantity of gas discharged into the outlet compartment to provide an immediate decline in the rate of gas flow following the peak rate to control the quantity of particulate material displaced from the material support members, and means for discharging from the inlet compartment material which is displaced thereinto by the mass movement means.

The present invention provides for cleaning the fluid entry face of a granular material contactor panel by causing a surge flow of gas through granular material at an intensity and volume to cause the granular material to move in a mass toward the outer edges of supporting members and to cause a portion of the granular material to spill from the supporting members. The quantity of solids removed from the contactor may be held to a small fraction of the total quantity of solids in the contactor.

The invention will be more particularly described in conjunction with the following drawings wherein.

The term granular material or sand as used herein and in the claims refers to the physical characteristics of the material making up the bed and includes any granular or particulate material suitable for practicing the invention. The actual chemical composition of the granular material or sand to be used in a particular application is at least in part dependent upon the process or treatment involved. For example, in practicing the invention for separatnig fly ash from gases, a well graded quartz sand might be desirable. Several ranges of well graded quartz sand within the limits of 16–100 mesh have been tested and found satisfactory for this application. For gas-solids contact work carrying out a chemical reaction in place of or in addition to mere mechanical filtering, the process would dictate the chemical composition of the sand or granular material to be used in the bed.

Figure 1:
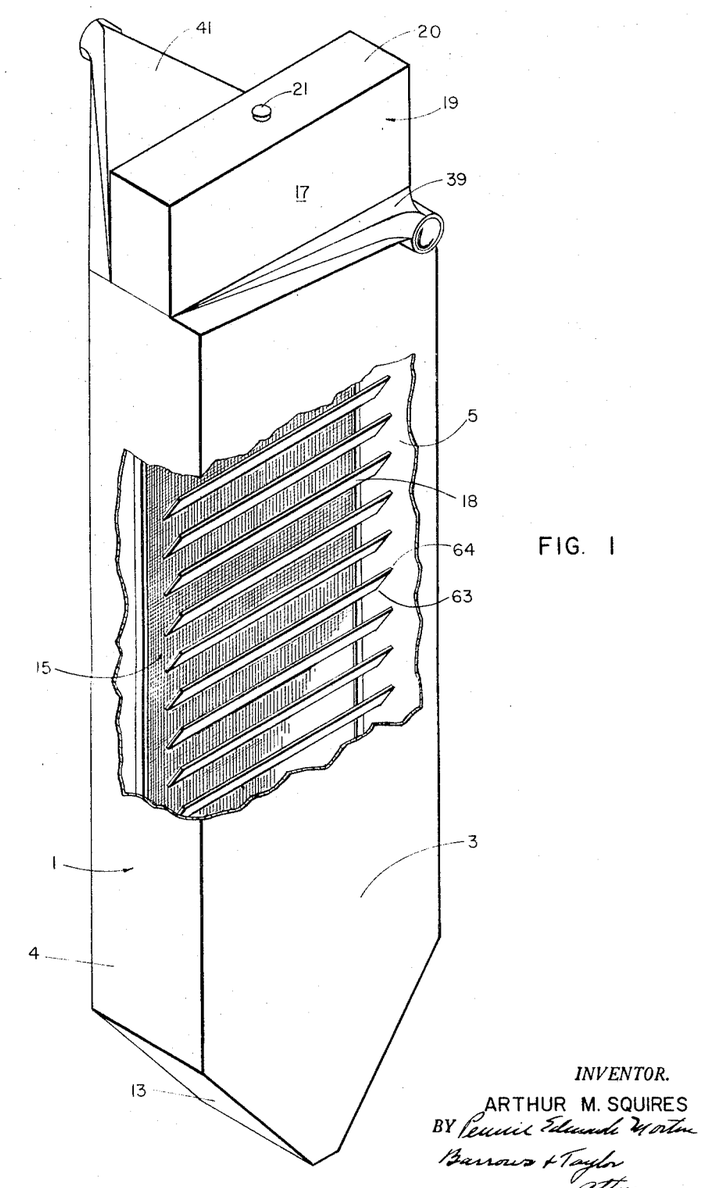
FIG. 1 is a perspective view, partly broken away, of a preferred contacting panel, with the sand removed, which panel is particularly suitable for use as a dust collector and will be so described.
Figure 2:
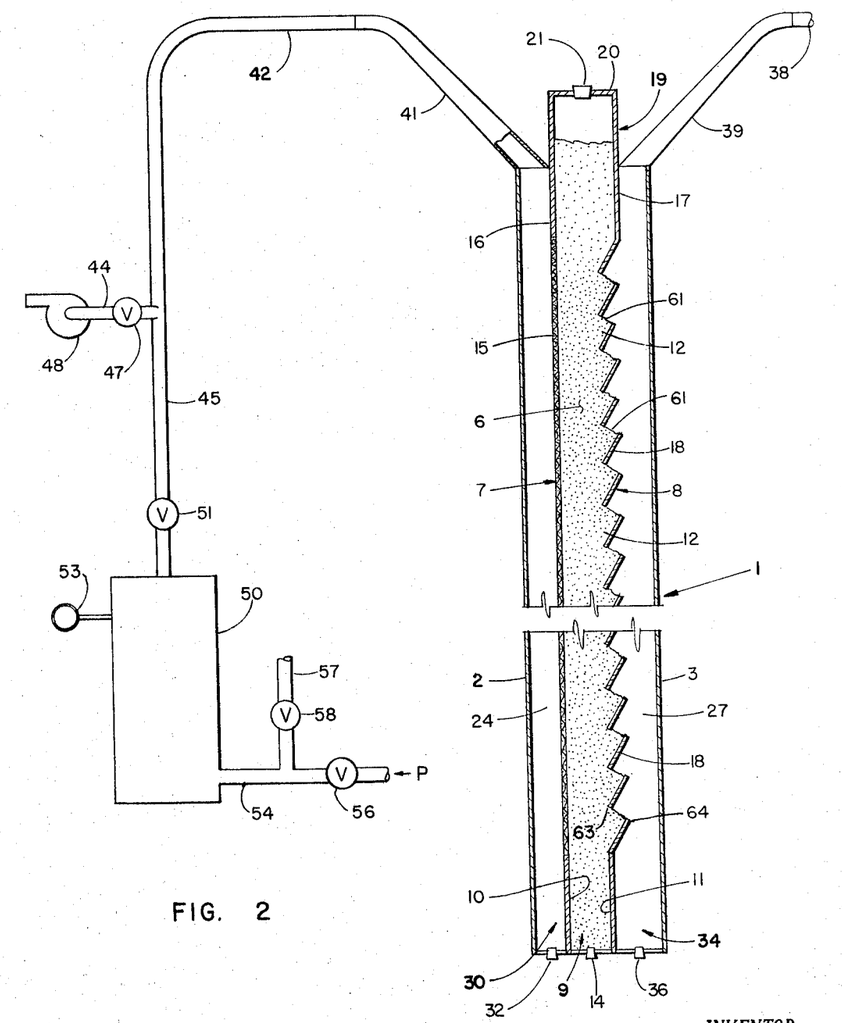
FIG. 2 is a vertical sectional view of the filter panel in FIG. 1, with a bed of sand.

As illustrated in the drawing, the loose surface filter panel 1 comprises a casing of rectangular cross-section having opposed side walls 2 and 3 and opposed edge walls 4 and 5. A generally vertical bed of granular material 6 is within the casing and retained by vertically extending extending spaced perforate walls 7 and 8.

Perforate wall 7 consists of a wire mesh screen 15 extending between the edge walls 4 and 5. Screen 15 is of the proper mesh to retain the granular particles while allowing passage of gas through the bed without excessive pressure drop. While a wire mesh screen is illustrated, a series of spaced louvers or other types of perforate walls designed to retain the sand bed while allowing the passage of gas through the bed would be satisfactory.

Perforate wall 8 comprises a series of inclined interposed louvers or supporting members 18 mounted in Venetian blind fashion extending outwardly from the bed to retain the granular material in place during the filtering operation. The perforations of the wall 8 are to be considered as being formed between respective heel portions 63 of the adjacent louvers 18.

Perforate wall 7 and casing side wall 2 are spaced from one another to form with the casing edge walls 4 and 5 a gas passage 24. Similarly, perforate wall 8 and side wall 3 form with edge walls 4 and 5 a gas passage 27. Gas passages 24 and 27 are in communication with each other through the bed of granular material 6.

Underlying the bed of granular material 6 is a bin portion 9 having side walls 10 and 11 continuing downwardly from the respective perforate walls 7 and 8, and inclined bottom walls leading to a drain outlet controlled by plug 14. Similarly, underlying the gas passages 24 and 27, respectively, are bin portions 30 and 34 having inclined bottom walls terminating adjacent outlets controlled by drain plugs 32 and 36, respectively. As shown in the drawings the container has inclined bottom surfaces 13 which provide the bottom walls for the respective bin portions.

Contiguous with and continuing upwardly from perforate walls 7 and 8 are upper side walls 16 and 17 which join edge walls 4 and 5 to form an overhead bin or reservoir 19. Reservoir 19 has a cover 20 with a material inlet controlled by a plug 21.

Gas passage 27 is connected to a gas-inlet conduit 38 by a generally triangular shaped adapter conduit 39. Conduit 38 is adapted to be placed in communication with a source of untreated or dirty gas, such as exhaust gas from a furnace when the panel is used as a filter. Similarly, gas passage 24 is connected to a conduit 42 by a generally triangular shaped adapter conduit 41. The conduits 42 and 41 form a passageway for the removal of clean or treated gas from the loose surface contactor.

As shown schematically in FIG. 2 conduit 42 branches into lines 44 and 45. Line 44 has a valve 47 and connects conduit 42 with the gas inlet of a blower 48. Line 45 connects conduit 42 with a gas tank 50, which is loaded with gas under pressure. A quick-opening valve 51 is located in line 45 and controls flow of gas from tank 50 to conduit 42 as will be subsequently described.

Pressure gauge 53 is connected to and indicates the gas pressure in tank 50. Connected to the lower end of tank 50 is a conduit 54 leading to a source of pressure P. Valve 56 located in conduit 54 controls the admission of gas from pressure source P to tank 50. A branch line 57 with a valve 58 is connected to conduit 54 intermediate tank 50 and valve 56 so that gas can be bled from tank 50 if necessary.

Figure 3:
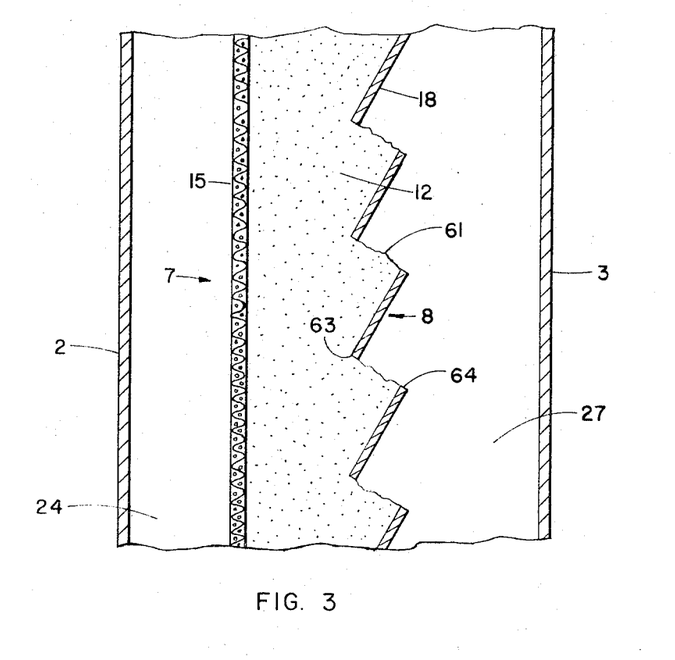
FIG. 3 is an enlarged view of a portion of the louvers and sand bed of FIG. 2.

In operation, the filter panel 1 is initially charged with granular material, with plugs 14, 32 and 36 in place, as shown. Plug 21 is removed, and granular material is fed through the opening in cover 20 of reservoir 19 to build up a bed of granular material between perforate walls 7 and 8 and to provide a supply of granular material in reservoir 19. Resting upon and separated by the interposed supporting members or louvers 18 are transversely disposed, vertically spaced, superposed gas entry portions 12 of the granular material bed 6 having free surfaces 61 inclined to the horizontal at the natural angle of repose of the granular material, and exposed to gas passage 27. Louvers 18 are positioned so that the granular material, as initially charged to the panel, will be retained by the perforate wall 8; that is, the louvers 18 are positioned so that a plane connecting the inner edge portion or heel 63 of each louver 18 with the outer edge portion or peak 64 of the subjacent louver is inclined to the horizontal at an angle less than the angle of repose of the granular material used in the filter bed. Or as stated more generally, imaginary plane surfaces connecting heels 63 of louvers 18 with toes 64 of the respective subjacent louvers extend above the respective imaginary plane surfaces commencing from heels 63 and extending outwardly and downwardly toward passage 27 at the angle of repose of the granular material making up the bed. When using the present invention as a gas filter, it is preferable that the peak edges of the louvers extend just slightly beyond the toes of the granular material surfaces in the initial fill position of the sand bed 2 as illustrated in FIGS. 1–3.

In addition, although not necessary for carrying out the invention in its broadest aspects, it is desirable that the louvers 18 be inclined to the horizontal at an angle greater than the angle of repose of the granular material to be used as the filter media in order to enable complete draining of the bed by gravity, if desired, by merely removing plug 14.

During the filtering cycle, gas-inlet conduit 38 is connected to a source of untreated or dirty gas, and blower 48 is operated to create a reduction in pressure at the outlet side of the panel through conduits 44, 42, 41 and gas passage 24. Alternatively, the incoming gas may be fed to the intake gas passage 27 under positive pressure from a blower or other means, rather than being induced by the blower 48. The difference in pressure on opposite sides of the bed of granular material 6 causes the dirty gas to flow via conduits 38, 39 and gas passage 27 through the bed of granular material 6 to the gas passage 24, conduits 41, 42 and 44. The dirty gas first contacts bed 6 and most of the filtering takes place at the exposed free surfaces 61, that is, adjacent the gas entry portions of the filter panel, and particulate material carried by the gas deposits and accumulates on surfaces 61, so that the particles of dust and dirt are separated from the gas.

The gas to be treated is caused to flow through the filter panel, that is, inwardly of the gas entry portions and outwardly from gas exit portions, until an accumulation of filtered particulate material builds up on surfaces 61 sufficiently as to adversely affect the pressure drop across the filter panel. Then the flow of dirty gas is stopped, preferably by disconnecting blower 48 from conduit 42, such as by actuating valve 47.

To clean the bed of granular material 6, valve 51 is then quickly opened, and the sudden removal of a barrier between the relatively high gas pressure in tank 50 and the relatively low pressure in conduits 45, 42, 41 and gas passage 24 causes a shock wave of gas to travel through the granular material in a direction reverse to the normal flow of gas during the treating process. The volume and pressure of the gas initially contained in tank 50 are of a magnitude to effect a surge flow of gas through the filter panel so as to move the sand or granular material in a mass toward gas passage 27. Since the gas entry surfaces 61 initially were substantially contiguous with the outer edges 64 of supporting members 18, the mass movement of the granular material carries a portion of the granular material bed including the free surfaces 61 and the filtered dust deposited thereon beyond the outer edges 64, and gravity causes a spilling of this material from the supporting members 18. After the bed is cleaned, the cleaning cycle is repeated and dirty or untreated gas is again passed through the panel. By regulating the intensity and volume of the reverse surge flow of gas, the amount of material removed from the outer portion of the filter bed may be controlled, and thus it is possible to regulate the amount of granular material removed from the bed. Optimum results are obtained when the reverse surge flow causes a dense plug-like movement of granular material between adjacent louvers so that a neat slice is removed from each gas-entry face of the bed.

The surge flow of gas necessary in practicing the invention is possible because of the compressible nature of gas. When released, the compressed gas expands and acts with explosive force on the granular material in the bed. Not sharing this compressible nature, liquids are unsuitable for carrying out the invention.

The material removed from the gas entry portions falls into bin portion 34 underlying gas passage 27. Bin portion 30 receives any material which may be carried beyond perforate wall 7 during filling of the sand bed or during operation.

After the momentary high intensity reverse surge flow has been effected, fresh granular material will flow automatically by gravity from the overhead bin 19 to replace the material which was removed from the filter panel, and the flow of gas to be treated is resumed. It is important that reservoir 19 be provided with additional granular material periodically so that fresh sand will always be available to automatically replace the granular material which is removed from the bed. Also, bin portions 30 and 34 need be emptied periodically to prevent an undesirable buildup of material, in gas passages 24 and 27. In applications where the dirty granular material is capable of being readily cleaned, revivified or regenerated, it might be desirable to freshen the dirty material removed from the bed and reuse it in the bed. For example, when practicing the invention as a dust collector for the removal of fly ash from furnace gases, the dirty sand removed from bin 34 may be cleaned and recirculated to the bed through reservoir 19.

Figure 4:
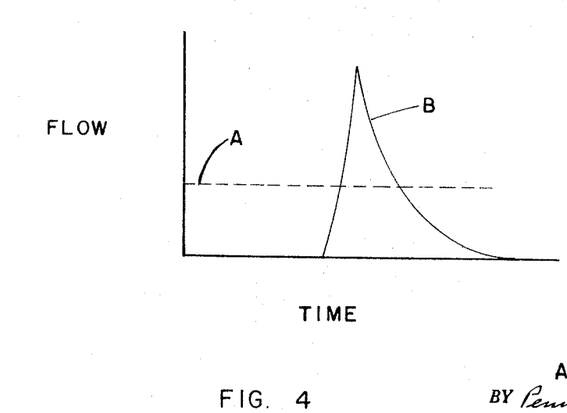
FIG. 4 is a graph illustrating the type of reverse flow needed to practice the invention.

It must be emphasized that not just any reverse flow of gas will accomplish the aforementioned result. FIG. 4 illustrates a graph having two curves A and B. Curve A, which is a broken horizontal line, indicates the minimum steady flow rate at which a flow of gas causes motion of the granular material bed surfaces in a typical installation. Curve B indicates a flow pattern affording adequate surge flow to practice the invention. The substantially instantaneously applied rate of flow needed to move the mass of granular material between adjacent louvers, as shown by curve B, is appreciably greater than the minimum steady flow rate of curve A. A high intensity surge of gas for a short duration is required. There must be sufficient surge or acceleration sharply peaking to a high flow rate to create a shock wave acting through the bed to cause a mass movement of the sand or granular material. The almost immediately applied intense flow preferably should be applied only long enough to move the outer surface portion of the bed beyond the outer edges of louvers 18 the desired amount, after which the intensity should be reduced sharply or cut off entirely. If the intense flow rate were applied for a longer period of time than necessary, a considerable amount of the granular material bed would be lost, and possibly the entire bed blown clear of the supporting members. No values have been placed on the curves in FIG. 4 since the minimum steady flow rate, and the surge flow pattern needed to carry out the invention are dependent on a great number of things including the particle size and characteristics of the sand or granular material forming the bed, the spacing and positioning of the supporting members, the thickness of the bed and the nature of the gas used to create the reverse surge. Moreover, for a given installation, the shape of the curve necessary to afford adequate surge flow may vary within limits. However, all suitable flow patterns will indicate the need for a substantially instantaneous high intensity flow of gas to create a shock wave necessary to move the granular material in mass.

Valve 51 is a quick opening valve so that the contents of the tank are placed in open communication with the sand bed suddenly to provide the desired surge flow. Were valve 51 to open slowly, the flow would not accelerate sufficiently to move the sand bed as previously described. In terms of the graph, the slope of the curve B must be steep so that a high flow rate occurs almost instantaneously to act on the bed with an explosive force.

It is preferred to employ a free surge method; that is the valve 51 is opened for an indefinite period of time so that the tank 50 is freely vented during each surge flow. Hence tank 50 is of limited volume so that the high flow rate falls off quickly after valve 51 is opened. While the free surge flow is preferred, the invention can be carried out with a larger volume source or reservoir of gas under pressure being placed in communication with the clean side of the filter panel for a definite predetermined period of time by opening and closing valve 51. Since the movement of the bed is caused primarily by gas flow corresponding to the upper regions of curve B, gas flow corresponding to the lower portion of the curve, that is flow having little or no effect on movement of the sand bed, need not be continued. The important factor is to employ means producing an intense surge flow of gas long enough to effect removal of the desired amount of granular material.

Figure 5:
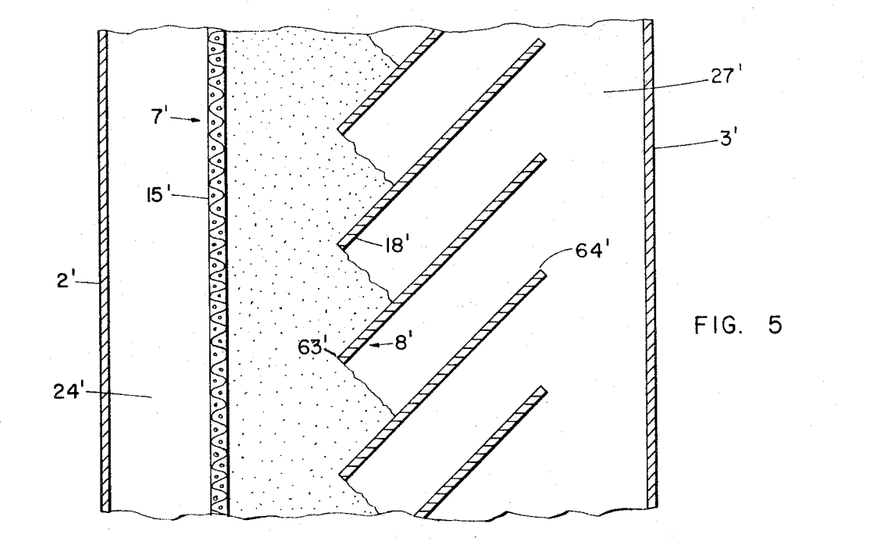
FIG. 5 is an enlarged sectional elevation view of a portion of a modified solids-gas contacting panel with the sand in the initial fill position.
Figure 6:
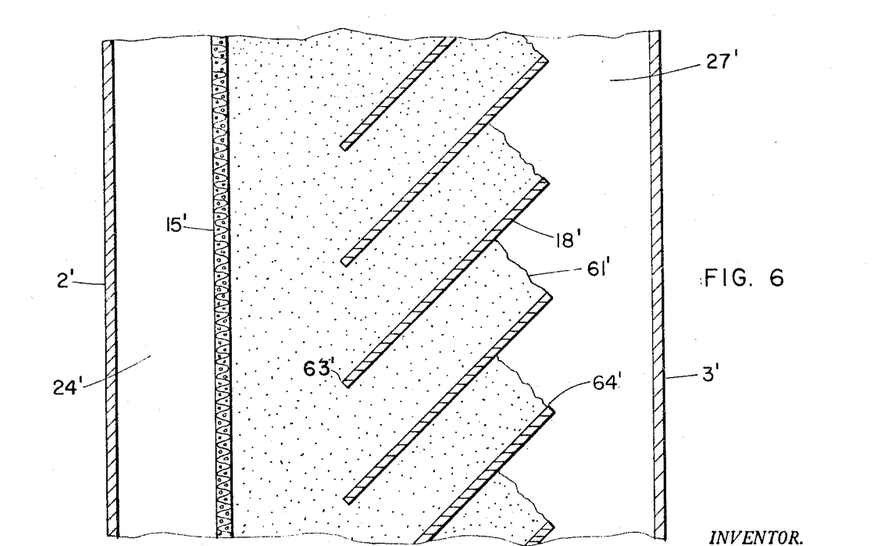
FIG. 6 is a view of the panel of FIG. 5 with the sand in the operating position.

FIGS. 5 and 6 illustrate a modified loose surface contactor which has particular utility in gas-contacting fields where maximum contact between gas and solids is desirable. The individual supporting members 18' illustrated, are considerably wider than the previously described supporting members 18 so that the peak or outer portions of the supporting members are at least as high an elevation as the heel or inner portions of the adjacent upper supporting members. When the panel is initially charged with granular material, as shown in FIG. 5, the peak or outer edge 64' of each supporting member extends a considerable distance beyond the toe of the free surface of the corresponding fluid entry portion. By producing a number of reverse surge flows, similar to those previously described in conjunction with FIG. 4, the granular material will be moved into the operating position shown in FIG. 6. By having the supporting members extend well beyond the toes of the respective free granular faces in the initial fill position, and moving the bed outwardly adjacent the outer edge portions of the respective supporting members, the gases to be treated will pass through a considerably longer path of granular material than in the FIG. 1 embodiment.

It is highly desirable that the free granular material surfaces be substantially contiguous with the outer edges of the supporting members throughout the width and height of the contactor. Having the free granular material surfaces substantially contiguous with the louver edges throughout the width and height of the contactor assures a substantially uniform spillage of material from all of the surfaces across the entire length of the bed with a minimum of expended power. Moreover, by having the free granular material surfaces in the same relative position after each reverse surge flow, it is easier to control the amount of spillage or the thickness of the slices removed from the bed through regulation of the intensity and duration of the reverse surge flows. Also, the similar granular material levels between each pair of adjacent supporting members ensures that the gases to be treated will have substantially the same duration and degree of contact with the granular material irrespective of where the gas enters the bed.

In the FIG. 1 embodiment, the granular material will assume the above described position in the initial fill position. In the FIGS. 5 and 6 embodiment the supporting members 18' preferably are inclined to the horizontal at an angle less than the angle of internal friction of the granular material making up the bed so that material moved outwardly between adjacent supporting members by reverse surge flows will not be dragged downwardly toward the interior of the panel by downward movement of the granular material in the interior of the bed occurring after each surge flow. Were the inclination of the supporting members 18' steeper than the angle of internal friction, when the granular material is moved in a mass outwardly toward gas passage 27' by a reverse surge flow of gas, the material moved outwardly in the lower portion of the panel would be replaced by the granular material between the supporting members of the upper portion of the panel rather than from the overhead bin. However, with the supporting members 18' inclined at an angle less than the angle of internal friction, the sand moved outwardly on the supporting members short of the outer edge portion 64' during any reverse surge flow, will remain there as long as the bed is charged with sand from the overhead sand bin or reservoir, or until forced outwardly and spilled from the supporting members by a subsequent reverse surge flow of gas. And when granular material is removed by a subsequent reverse flow of gas, it will be replaced by material from the overhead bin and not from material between supporting members in the upper portion of the panel. Hence, the free granular material surfaces in the FIG. 6 modification will be maintained substantially contiguous with the outer edges of supporting members 18' throughout the operation of the loose surface contactor.

In use of the loose surface contactor solely as a dust collector, the particulate matter is separated at the gas entry surfaces of the bed with little penetration of the filtered material into the sand mass. Therefore, in using the invention for dust collection purposes, a narrow bed of granular material such as the FIG. 1 modification is preferable due to the lower power requirements.

While the modification of FIGS. 5 and 6 could be used as a dust collector, this loose surface contactor is particularly desirable where it is advantageous for the gas to flow through a long path of granular material to provide a maximum amount of countercurrenticity between the gas and the granular material. For example, in some gas contacting applications where the gas reacts with the granular bed, while initially reacting with the outer surfaces of the gas entry portions, some of the reaction takes place inwardly of the outer surfaces, and a growing layer of spent material will appear in the bed, commencing from the outer surfaces. The spent or used up material should be removed before the layer of spent material extends to the inner edges or inner portions 63' of the supporting members so that the spent material does not proceed inwardly beyond the point at which it can be removed by one or more surge flows of gas in the reverse direction. In some applications where the spent material is to be removed as a product of the operation, only a portion of the layer need be removed during each cleaning cycle. This would ensure that the product removed would have been completely reacted by the incoming gas before it is removed from the bed.

The foregoing description has been directed to a single contactor panel to facilitate understanding applicant's invention. In an actual installation it might be desirable to have a number of contactor panels. For example, several panels might be arranged in parallel, with adjacent panels facing in opposite directions, and spaced from one another to form gas passages therebetween. In this arrangement, the gas passages would be manifolded so that alternate passages would be inlet passages to receive the untreated or dirty gases, and the remaining alternate passages would serve as outlet passages to carry away the clean or treated gases. Each gas passage would service two opposed contactor panels, either as an inlet or dirty gas passage or as an outlet or clean gas passage. Also, an installation might be divided into a number of sections whereby one or more sections could be subject to reverse surge flows while other sections simultaneously are on line and effecting treatment of dirty gas or granular material. The principle of operation of such installation would be the same as described above.

It will be apparent that there has been provided a fluid-solids contactor of the counter-flow or counter-current type, since the fluid being treated is passed through the contactor in one direction, and the granular material is passed from the contactor in a reverse or opposite direction. This arrangement provides for the removal of material which has been subject to the greatest amount of untreated gas, so that the spent or used up material will be removed from the bed while allowing retention of the clean granular material.

The specific embodiments shown in the drawing and described above are for illustrative purposes only and are not intended to limit applicant's invention, the scope of which is embraced in the following claims.

I claim:

1. The method of treating at least one of a granular material and a fluid by contact with one another comprising arranging the granular material in a bed having a plurality of transversely disposed, upwardly spaced, fluid entry portions separated and supported by interposed members having outer and inner edges with respect to said bed, said bed having fluid exit portions spaced from said inner edges, passing fluid through said fluid entry portions and outwardly from the fluid exit portions of the bed, and thereafter causing a surge flow of a gas sharply peaking substantially above and substantially immediately declining below the minimum steady flow rate at which the flow of gas causes motion of the granular material and in a reverse direction through said fluid entry portions to remove a portion of the granular material from the bed.

2. The method of treating a fluid by contact with a granular material which comprises arranging the granular material in a bed having a plurality of transversely disposed, upwardly spaced, fluid entry portions separated and supported by interposed members having outer and inner edges with respect to the bed of granular material, said bed having fluid exit portions spaced from said inner edges of the supporting members, flowing the fluid to be treated through the fluid entry portions of the bed and outwardly from the fluid exit portions of the bed, causing a surge flow of gas sharply peaking substantially above and substantially immediately declining below the minimum steady flow rate at which the flow of gas causes motion of the granular material and in reverse direction through said fluid entry portions to move the granular material in a mass toward the outer edges of the supporting members and to cause a portion of the granular material to spill from the outer edges of the supporting members, and supplying fresh granular material to the bed in an amount substantially equal to that spilled over the outer edges of the supporting members.

3. The method of treating a gas involving the separation and removal of particulate material by means of a filter of granular material which comprises arranging the granular material in a filter bed having a plurality of transversely disposed, upwardly spaced, gas entry portions separated by interposed members having outer and inner edges with respect to the filter bed, said filter bed having gas exit portions spaced from said inner edges, flowing the gas to be treated through said filter bed by passing it inwardly through the gas entry portions and outwardly from the gas exit portions to separate and accumulate particulate material at the outer surfaces of the gas entry portions, stopping the flow of gas to be treated, causing a reverse surge flow of gas sharply peaking substantially above and substantially immediately declining below the minimum steady flow rate at which the flow of gas causes motion of the granular material and through the gas entry portions in a reverse direction to cause the granular material to move in a mass in said reverse direction to cause a portion of the granular material including said outer surfaces and accumulated particulate material to spill from said outer edges, and also supplying fresh granular material to the upper portion of the filter bed.

4. A method of contacting fluid and granular material with each other to effect treatment of at least one of them comprising arranging granular material in a bed having a plurality of transversely disposed, upwardly spaced fluid entry portions separated by interposed supporting members having outer and inner edges, said fluid entry portions having fluid entry faces substantially contiguous with said outer edges, said bed having fluid exit portions spaced from said inner edges, flowing fluid through the fluid entry portions of the granular material bed and outwardly from the fluid exit portions to effect treatment of one of said fluid and granular material, causing a surge flow of gas sharply peaking substantially above and substantially immediately declining below the minimum steady flow rate at which the flow of gas causes motion of the granular material and in a reverse direction through the fluid entry portions to cause a portion of the granular material at the gas entry faces to move in said reverse direction beyond said outer edges of the supporting members to be displaced from said bed, supplying fresh granular material to said granular material bed to replace the displaced material at the fluid exit portion and to restore the granular material in the fluid entry portions of the bed with its fluid entry faces substantially contiguous with said outer edges of the supporting members.

5. A method of treating a gas by contact with granular material which comprises arranging granular material in a bed having a plurality of transversely disposed, upwardly spaced gas entry portions separated by interposed supporting members having outer and inner edges, said gas entry portions having free surfaces spaced from said inner edges a substantial distance and contiguous with said outer edges, said bed having gas exit portions spaced from said inner edges, flowing the gas to be treated through the gas entry portions of the bed and outwardly from the gas exit portions to effect treatment of the gas, causing a surge flow of gas sharply peaking substantially above and substantially immediately declining below the minimum steady flow rate at which the flow of gas causes motion of the granular material and through the gas entry portions of the bed in a reverse direction through the gas entry portions to cause a portion of the granular material at the gas entry faces to flow outwardly and downwardly under the force of gravity, supplying fresh granular material to said bed to replace the displaced material and restoring the gas entry portions with their free surfaces spaced from said inner edges and substantially contiguous with said outer edges of the supporting members.

6. A gaseous fluid-solid contactor comprising a pair of upwardly extending horizontally spaced-apart perforate retaining walls, a gaseous fluid inlet compartment adjacent and in communication with the perforations of a first of the perforate walls, a gaseous fluid outlet compartment adjacent and in communication with the perforations of the second of the perforate walls, closure means about the space between the first and second perforate walls closing said space against the passage of gas except through the perforations of said perforate walls, feed means for supplying a loose solid particulate material into the space between the perforate walls, a plurality of particulate-material support members each adjacent a perforation of said first perforate wall, said particulate-material support members being arranged to extend outwardly and upwardly from below their adjacent perforations and into the inlet compartment to support and expose to the inlet compartment a plurality of free surfaces of particulate material, an inlet for admitting a gaseous fluid into the inlet compartment for passage into the free surfaces and through the particulate material to the outlet compartment, an outlet for discharging gaseous fluid from the outlet compartment, means for periodically effecting a mass movement toward the inlet compartment of at least those portions of the particulate material including said free surfaces and which are retained on said supporting members, said mass-movement means comprising:

(1) a source of gas under pressure;
(2) means for effecting a sudden discharge of gas from the pressure source into the outlet compartment and against the particulate material at a sharply peaking rate of gas flow having a peak value substantially in excess of the minimum steady flow rate at which a flow of gas causes motion of the particulate material;
(3) volume control means for limiting the quantity of gas discharged into the outlet compartment to provide an immediate decline in the rate of gas flow following the peak rate to control the quantity of particulate material displaced from the material support members; and means for discharging from the inlet compartment material which is displaced thereinto by the mass movement means.

7. A gaseous fluid-solids contactor as set forth in claim 6 which said feed means includes a fresh granular material reservoir, means for maintaining a bed of material in the space between the perforate walls.

8. A gaseous fluid-solids contactor as set forth in claim 6 wherein the individual supporting members are inclined to the horizontal at an angle less than the angle of internal friction of the granular material, and the outer portion of each supporting member being at least as high as the inner portion of the superjacent supporting member.

9. A gaseous fluid-solids contactor as set forth in claim 6 wherein the mass movement means comprises a tank having gas at a predetermined volume and pressure to effect the desired movement of granular material when placed in open communication with the bed, valve means for placing the tank in open communication with said granular material bed, and means for interrupting said fluid passage means while the tank is in communication with the granular material bed.

10. A gaseous fluid-solids contactor as set forth in claim 6 wherein the outer portions of the free granular material surfaces are substantially contiguous with the respective outer portions of the supporting members.

11. A gaseous fluid-solids contactor as set forth in claim 10 wherein the supporting members are positioned so that the free granular material surfaces extend from adjacent said inner portions of each of the supporting members to substantially contiguous with the outer portions of the respective subjacent supporting members.

12. A gaseous fluid-solids contactor as set forth in claim 10 wherein the individual supporting members are inclined to the horizontal at an angle less than the angle of internal friction of the granular material making up the bed and the supporting members are of sufficient width so that the free granular material surfaces in the operating position of the contactor are located outwardly a substantial distance from their respective initial fill positions.

References Cited by the Examiner

UNITED STATES PATENTS

| | | | |
|---|---|---|---|
| 290,928 | 12/1883 | Rew | 55—479 |
| 989,665 | 4/1911 | Tixier | 210—268 X |
| 2,287,983 | 6/1942 | Gavett | 210—268 X |
| 2,291,383 | 7/1942 | Espenschied | 55—474 X |
| 2,293,113 | 8/1942 | Carney | 55—474 X |
| 2,493,356 | 1/1950 | Mercier et al. | 55—474 X |
| 2,521,195 | 9/1950 | Wheeler | 55—390 X |
| 2,559,784 | 7/1951 | Moore | 210—80 |
| 2,780,363 | 2/1957 | Pew | 210—82 |
| 3,030,798 | 4/1962 | Lichtenfela | 55—386 X |
| 3,093,465 | 6/1963 | Latta | 55—34 X |

FOREIGN PATENTS

| | | |
|---|---|---|
| A. 26,145 | 4/1923 | France. |
| 899,920 | 9/1944 | France. |
| 381,500 | 5/1924 | Germany. |
| 409,942 | 2/1925 | Germany. |
| 419,764 | 10/1925 | Germany. |
| 515,188 | 12/1930 | Germany. |
| 522,573 | 4/1931 | Germany. |
| 55,928 | 4/1911 | Switzerland. |

REUBEN FRIEDMAN, *Primary Examiner.*

D. E. TALBERT, JR., *Assistant Examiner.*

UNITED STATES PATENT OFFICE
CERTIFICATE OF CORRECTION

Patent No. 3,296,775 January 10, 1967

Arthur Morton Squires

It is hereby certified that error appears in the above numbered patent requiring correction and that the said Letters Patent should read as corrected below.

Column 1, line 33, for "Venetion" read -- Venetian --; column 2, lines 17 and 18, for "particulate material" read -- particulate-material --; line 30, for "three" read -- free --; line 33, for "pressures" read -- pressure --; column 3, line 16, for "separatnig" read -- separating --; line 29, strike out "extending"; column 10, line 50, for "reservoir," read -- reservoir --.

Signed and sealed this 24th day of October 1967.

(SEAL)
Attest:

Edward M. Fletcher, Jr.            EDWARD J. BRENNER
Attesting Officer            Commissioner of Patents